(12) United States Patent
Ersoy et al.

(10) Patent No.: US 6,394,433 B1
(45) Date of Patent: May 28, 2002

(54) TWO-CHAMBER STEP BEARING WITH HYDRAULIC DAMPING

(75) Inventors: Metin Ersoy, Walluf; Klaus Kramer, Neuenkirchen, both of (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/762,273

(22) PCT Filed: May 30, 2000

(86) PCT No.: PCT/DE00/01729

§ 371 (c)(1),
(2), (4) Date: Apr. 11, 2001

(87) PCT Pub. No.: WO00/73677

PCT Pub. Date: Jul. 12, 2000

(30) Foreign Application Priority Data

Jun. 1, 1999 (DE) .......................... 199 25 105

(51) Int. Cl.$^7$ ................................. F16M 5/00
(52) U.S. Cl. .................... 267/140.14; 267/219
(58) Field of Search ............ 267/140.12, 140.13, 267/140.14, 140.15, 219

(56) References Cited

U.S. PATENT DOCUMENTS

| | | | |
|---|---|---|---|
| 4,420,060 A | * | 12/1983 | Kakimoto .................... 180/300 |
| 4,877,225 A | * | 10/1989 | Noguschi et al. ......... 267/140.1 |
| 5,492,311 A | * | 2/1996 | Kurr et al. ............. 267/140.13 |
| 5,601,280 A | * | 2/1997 | Nagaya et al. ......... 267/140.14 |
| 5,911,412 A | * | 6/1999 | Durand et al. ......... 267/140.13 |
| 6,017,024 A | * | 1/2000 | Muramatsu et al. ... 267/140.14 |
| 6,120,012 A | * | 9/2000 | Shibata et al. ......... 267/140.14 |

FOREIGN PATENT DOCUMENTS

| | | | |
|---|---|---|---|
| JP | 362270841 A1 | * | 11/1987 |
| JP | 405118376 A | * | 5/1993 |

* cited by examiner

Primary Examiner—Christopher P. Schwartz
Assistant Examiner—Xuan Lan Nguyen
(74) Attorney, Agent, or Firm—McGlew and Tuttle, P.C.

(57) ABSTRACT

A two-chamber step bearing with hydraulic damping, especially for mounting engines in motor vehicles, has at least one fluid-filled working chamber and at least one compensating chamber connected thereto by an overflow channel. An additional, blockable spring element (10) is arranged in series after the first hydraulic damping spring element comprising the working chamber (1), the compensating chamber (2) and the overflow channel (11), wherein the spring element (10) is arranged in a separate pretensioning chamber (8), which is connected to the working chamber (1) and the compensating chamber (2) by at least two switching elements (16, 17) which can be controlled independently from one another, and wherein the pretensioning chamber (8) can be filled up with hydraulic fluid for blocking the additional spring element (10) by the vibrations introduced into the two-chamber step bearing from the engine.

12 Claims, 8 Drawing Sheets

TWO-CHAMBER STEP BEARING WITH HYDRAULIC DAMPING

FIELD OF THE INVENTION

The present invention pertains to a two-chamber step bearing with hydraulic damping especially for mounting the engine in motor vehicles.

BACKGROUND OF THE INVENTION

Various designs of two-chamber step bearings have been generally known from the state of the art. A membrane of varying hardness and ductility may be arranged between the working chamber and the compensating chamber in some hydraulic step bearings. Such a membrane is usually called a coupling membrane, and the degree of mobility of the membrane determines the vibration amplitude which can be influenced, and the stiffness of the membrane determines the frequency of the vibration to be damped. If such a membrane is relatively soft, the vibrations acting on the hydraulic fluid of the working chamber are transmitted without resistance to the adjoining compensating chamber. However, if the membrane is provided with a relatively stiff structure, the vibrations acting on the hydraulic fluid will build up an overpressure in the working chamber, and this overpressure leads to a swelling of the uncoupling membrane and thus guarantees better damping, but a higher dynamic stiffness develops at the same time. It is desirable in the two-chamber step bearings known from the prior art for adaptation to different operating states to correspondingly adapt the vibration behavior of the hydraulic bearing to these operating states.

This is of significance especially because the disturbing vibrations generated by the engine during the operation of the vehicle occur essentially in two different forms and therefore require different stiffnesses of the engine mounts used for vibration damping. The different damping properties are of great significance especially in the direct-injection diesel engines that have been used for some time now because the vibrations occurring at idle in these engines are higher than in the diesel and gasoline engines used hitherto in automotive engineering, so that an especially soft engine mount is necessary for the operation at idle for vibration damping in these diesel engines, whereas a substantially stiffer engine mounting is advantageous for vibration damping in the drive mode.

Adaptation can be achieved in the above-mentioned two-chamber step bearings provided with an uncoupling membrane between the working chamber and the compensating chamber, e.g., by changing the stiffness of the membrane by, e.g., reducing or increasing the support diameters of the membrane. This can be brought about, e.g., by means of a motor operator with a plunger actuated by same, which presses the uncoupling membrane from below. However, the different spring stiffnesses necessary in the above-mentioned direct-injection diesel engines cannot be achieved with the two-chamber step bearing known from the state of the art because the values of the required spring stiffnesses have an excessively great difference.

A prior-art two-chamber step bearing, which is formed by a first hydraulic damping spring element, a spring element, at least one fluid-filled working chamber and at least one compensating chamber connected to same by an overflow channel, wherein an additional, blockable spring element, which is arranged in a separate pretensioning chamber is arranged in series after the said damping spring element, has been known from, e.g., DE 43 22 958 A1.

In addition, an additional spring element with a hydraulic functional connection with a first hydraulic damping spring element has been known in a two-chamber step bearing from JP Abstracts 62-270 841 (A), but the spring element disclosed in this document cannot be controlled or blocked.

SUMMARY AND OBJECTS OF THE INVENTION

The object of the present invention is therefore to improve a two-chamber step bearing with hydraulic damping especially for mounting the engine in motor vehicles such that it is also possible to achieve the very great differences in the spring stiffness of such two-chamber step bearings for the drive mode and operation at idle, which are required in the case of the use of modem diesel engines. In addition, such two-chamber step bearings shall have a compact design and their manufacture shall be inexpensive and they shall operate reliably under all required operating conditions.

This object is accomplished corresponding to a first solution variant by the pretensioning chamber having the blockable spring element being hydraulically connected to the working chamber and the compensating chamber via at least two switching elements that can be controlled independently from one another. Due to the vibrations introduced by the engine into the two-chamber step bearing, the pretensioning chamber can be filled up with a hydraulic fluid, which makes possible the blocking of the additional spring element.

Another solution variant for the object is disclosed by the technical teaching of the pretensioning chamber being connected to the compensating chamber by a first line, in which a pumping device is arranged, which is driven by the vibrations introduced into the two-chamber step bearing and is provided for filling up the pretensioning chamber with hydraulic fluid, and by a second line with an electromagnetic on-off valve inserted therein.

Due to the embodiments according to the present invention corresponding to the two possible solutions, blocking of the second spring element, which is connected in series with the first damping spring element, is brought about as needed by the vibrations of the engine only, whose vibrations are to be damped by the two-chamber step bearing, and which vibrations are introduced into the two-chamber step bearing, without an external power source.

Due to the blocking of the additional spring element, the overall stiffness of the engine mount is substantially greater than when both spring elements connected in series are active. As a result, both a soft damping characteristic for the idle operation of a motor vehicle engine and a stiff damping characteristic for the normal drive mode are provided in the two-chamber step bearing according to the present invention. The blocking of the additional spring element can be eliminated via the switching element, which is present between the working chamber and the compensating chamber and which is preferably an electromagnetic on-off valve by a pressure equalization being brought about between the pretensioning chamber and the working chamber or the compensating chamber.

Special other embodiments of the first solution according to the present invention providing one switching element as the nonreturn valve arranged between the working chamber and the pretensioning chamber and providing one switching element as an electromagnetic on-off valve arranged between the compensating chamber and the pretensioning chamber. Special embodiments according to the second solution include providing the pretensioning chamber connected to the compensating chamber by a first line, in which a pumping device, which is driven by the vibrations introduced into the two-chamber step bearing and is provided for filling up the pretensioning chamber with hydraulic fluid, is arranged, and by a second line with an electromagnetic on-off valve inserted into it and by providing the pumping device with a plunger piston and a nonreturn valve, wherein the said nonreturn valve is arranged between the plunger piston and the compensating chamber and provides a possibility of flow from the compensating chamber to the pretensioning chamber.

In addition, additional advantageous embodiments of both solutions according to the present invention may employ the blockable spring element arranged between a partition, which forms a wall of the compensating chamber, and a movable bottom plate, which forms a wall of the pretensioning chamber. The said blockable spring element may comprise at least two, preferably three coil springs arranged concentrically to the central longitudinal axis of the two-chamber step bearing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
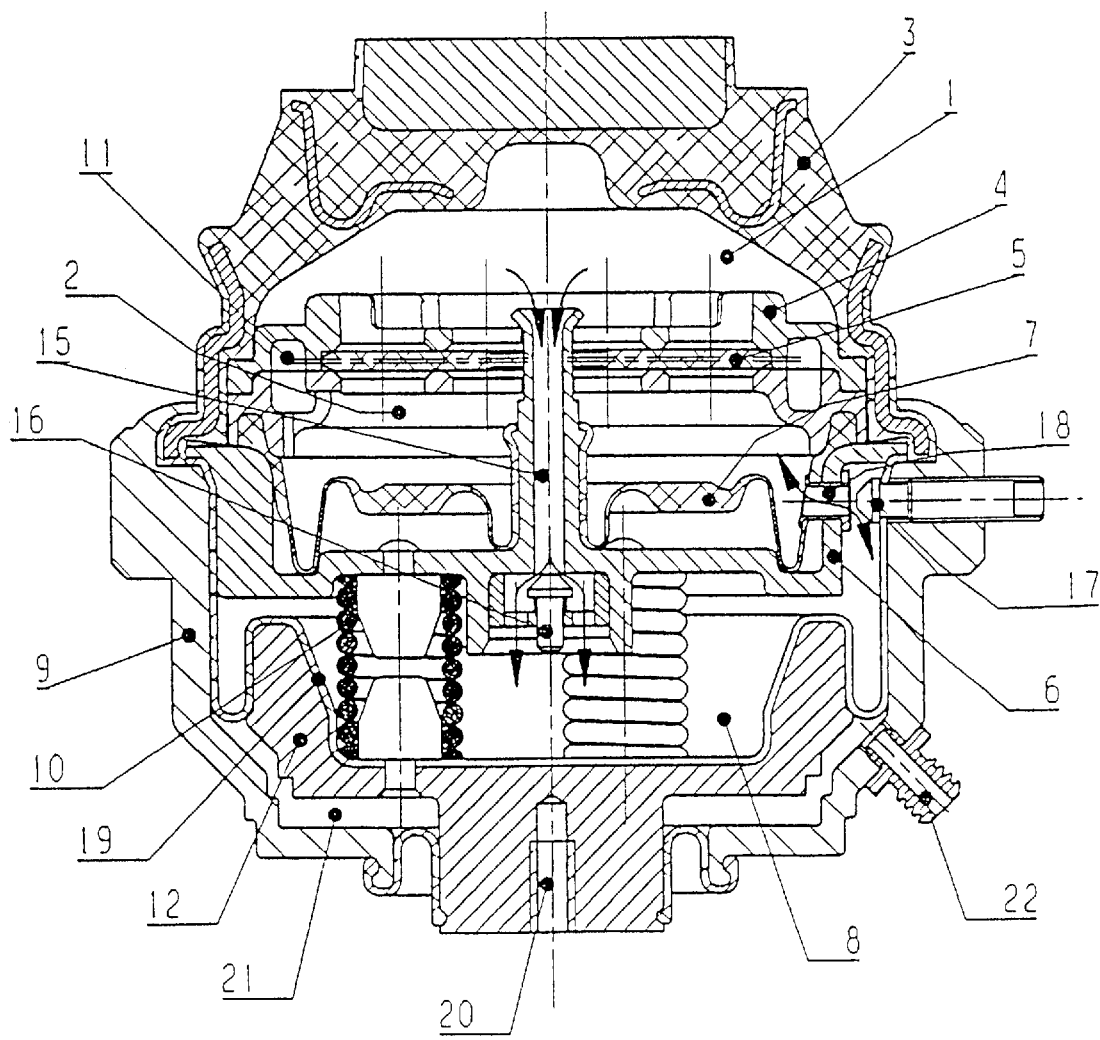
FIG. 1 is a sectional view of the two-chamber step bearing with the features corresponding to claim 1 in the switching position with soft damping characteristic.

Referring to the drawings in particular, all drawings show sectional views and details of the two-chamber step bearing according to the present invention in the installed, i.e., loaded state.

FIG. 1 shows a two-chamber step bearing, which has a working chamber 1, which is limited by a rubber wall 3 on its upper side facing the engine to be mounted. The lower limitation of the working chamber 1 is formed by an intermediate plate 4, in the middle area of which an uncoupling membrane 5 made of an elastic material is recessed. A compensating chamber 2 is located beneath the uncoupling membrane 5 and the intermediate plate 4, and a partition 6 is located on the underside of the compensating chamber 2. The compensating chamber 2 is sealed against the fixed partition 6 with a membrane 7 made of an elastic material.

On the lower side of the partition 6 facing away from the compensating chamber 2, an additional hollow space is arranged as a pretensioning chamber 8, whose side walls are formed by a pot-shaped housing 9 and inside which side walls three coil springs 10 located on a circle concentric to the central longitudinal axis are arranged. Only one of the coil springs 10 is shown in the view in FIG. 1. The three coil springs 10, of which only one is shown in FIG. 1, form a common, additional spring element under the first hydraulic damping spring element, which is formed by the rubber wall 3, the working chamber 1, the uncoupling membrane 5, the compensating chamber 2 as well as an overflow channel 11 located between the working chamber 1 and the compensating chamber 2. The coil springs 10 are supported on their top side at the partition 6, and the opposite end of the coil springs 10 is in contact with a bottom plate 12 of the two-chamber step bearing, which is arranged in the axial direction of the principal longitudinal axis of the two-chamber step bearing opposite the housing 9, displaceably in the said housing, and forms the bottom of the pretensioning chamber 8. The pretensioning chamber is sealed by an additional rolling membrane 19 made of an elastic material against the walls of the housing 9 as well as the bottom plate 12. On its underside facing away from the pretensioning chamber 8, the bottom plate 12 has a threaded hole 20 for fixing the two-chamber step bearing to the body.

FIG. 1 shows that a gap 21 of about 3–5 mm is present between the bottom plate 12 and the lower, body-side area of the housing 9. Based on the fact that the rubber wall 3 fixed to the engine and the bottom plate 12 fixed to the body have fixed positions, the introduction of vibrations into the two-chamber step bearing leads to a movement of the partition 6 between the first rubber spring element, which is hydraulically damped by the hydraulic fluid present in the working chamber 1, the compensating chamber 2 and the overflow channel, and the second spring element, which is formed by the coil springs 10 made of steel. The interaction of the two spring elements guarantees an effective damping of low-frequency vibrations of high amplitude due to its soft overall spring stiffness characteristic.

FIG. 1 also shows that the partition 6 has in its middle a tubular partial area 15, which extends upward into the working chamber 1 and which forms a connection between the working chamber 1 and the pretensioning chamber 8. The lower opening of the tubular partial area 15 is closed by a switching element 16 designed as a nonreturn valve. Another switching element 17, designed as an electromagnetic on-off valve, which is shown in the right-hand area of FIG. 1, is located between the pretensioning chamber 8 and the compensating chamber 2.

The interaction of the switching elements 16 and 17 as well as the pretensioning chamber 8 and the bottom plate 12 makes possible the build-up of a hydraulic pressure cushion within the pretensioning chamber 8 solely due to the vibrations introduced into the two-chamber step bearing via the engine. Due to the build-up of such a pressure cushion in the pretensioning chamber 8, the entire hydraulic bearing is raised except for the bottom plate 12 in relation to the body and the bottom of the housing 9 is thus pressed upward against the bottom plate 12, so that the force no longer flows via the coil springs 10, which are thus not functioning. The putting of the coil springs 10 out of operation leads to a substantial hardening of the damping characteristic of the two-chamber step bearing, because only the first rubber spring element acts.

The requirement for the build-up of the pressure cushion within the pretensioning chamber 8 is the severing of the connection between the pretensioning chamber 8 and the compensating chamber 2 by the closing of the on-off valve 17. Hydraulic fluid is prevented by this measure from flowing back into the compensating chamber 2, as is indicated by arrow P in the opened on-off valve 17 shown in FIG. 1. The pressure cushion is built up by an overpressure, which is generated by the introduction of vibrations into the working chamber 1 and which causes hydraulic fluid to enter the pretensioning chamber 8 through the nonreturn valve 16 opened by the overpressure from the working chamber 1 via the tubular partial area 15.

The hydraulic fluid having entered the pretensioning chamber presses the hydraulic bearing against the bottom plate 12 and brings about a bridging over of the coil springs 10.

The lowering of the hydraulic bearing can be supported by connecting a vacuum line to a connecting fitting 22. The connecting fitting 22 opens inside the housing 9 into the gap 21 under the bottom plate, so that the connected vacuum exerts a suction effect on the lower part of the housing 9.

Figure 2:
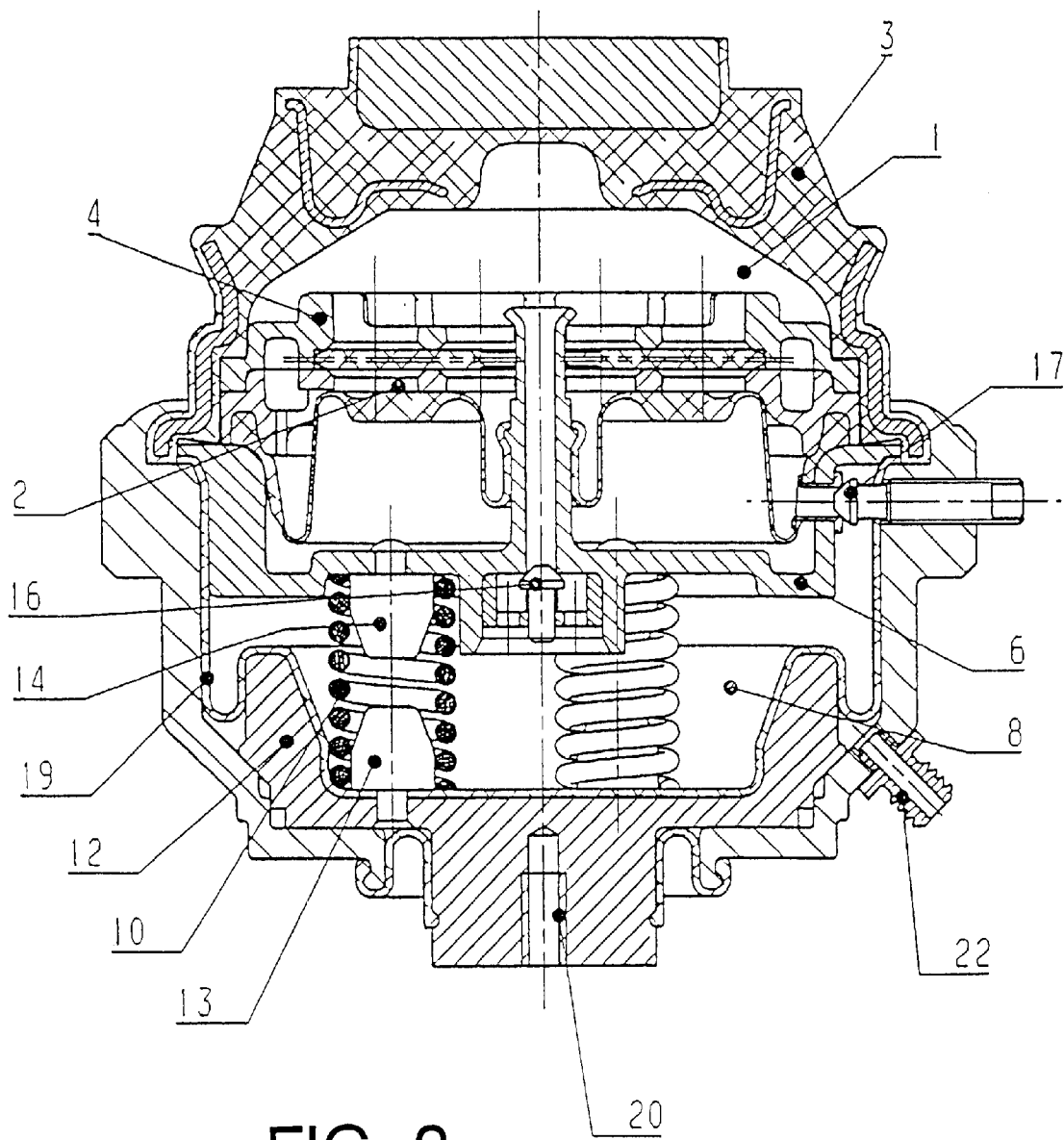
FIG. 2 is the two-chamber step bearing from FIG. 1 in the switching position with hard damping characteristic.

The position of the bottom plate 12 and of the on-off valve 17 are illustrated in FIG. 2, which shows the two-chamber step bearing in its operating state with hard damping characteristic. The coil springs 10 are prevented from slipping in this position by a respective mandrel 13 and 14 each engaging the upper and lower ends of the particular coil spring 10.

If the pressure cushion present in the pretensioning chamber 8, which makes the damping possibility of the coil springs 10 ineffective, is to be eliminated, it is necessary for the bottom plate 12 to be able to return into its original position, as is shown in FIG. 1. The pressure cushion within the pretensioning chamber 8 is eliminated by opening the electromagnetic on-off valve 17, as a result of which hydraulic fluid can flow through the connection hole 18 into the compensating chamber 2. The return into the raised position of the bottom plate 12 causes both the rubber damping spring element in the upper area of the two-chamber step bearing and the additional spring element formed by the coil springs 10 to be effective again, so that the damping characteristic for the two-chamber step bearing is, on the whole, softer than that seen when only the upper hydraulic rubber damping spring element acts.

Thus, FIGS. 1 and 2 show that a rigidity of the two-chamber step bearing, which differs greatly depending on the spring properties of the coil springs 10, can be brought about during blocking and non-blocking of the additional spring element formed by the coil springs 10. The coil springs 10 are blocked here only by the pumping action brought about as a consequence of the vibrations introduced into the two-chamber step bearing by the working chamber 1 and by the opening and closing of the connection hole 18 by the actuation of the electromagnetic on-off valve 17. It is possible to provide a possibility of achieving different damping properties by means of a single two-chamber step bearing in an extremely compact manner.

Figure 3:
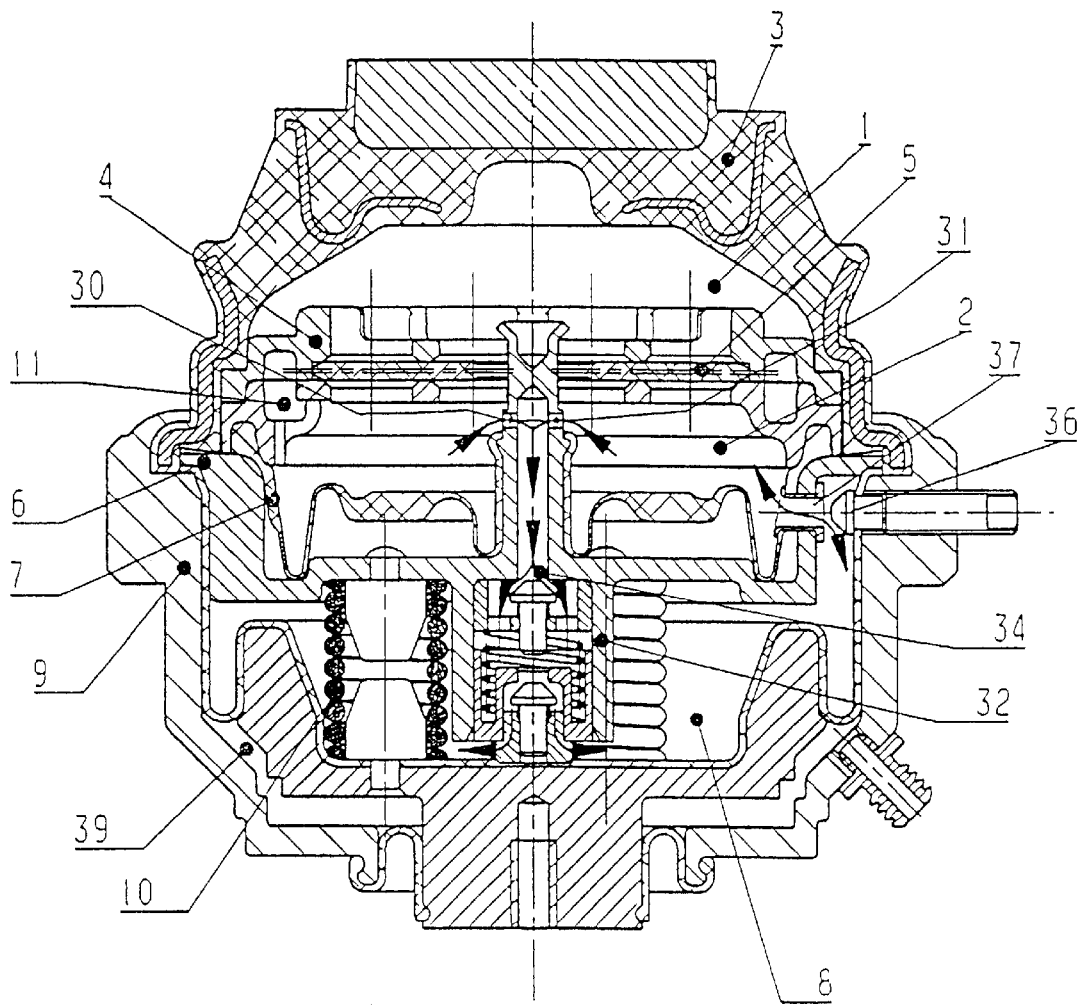
FIG. 3 is a sectional view of a two-chamber step bearing with the features corresponding to a second solution of the invention in the switching position with soft damping characteristic.
Figure 4:
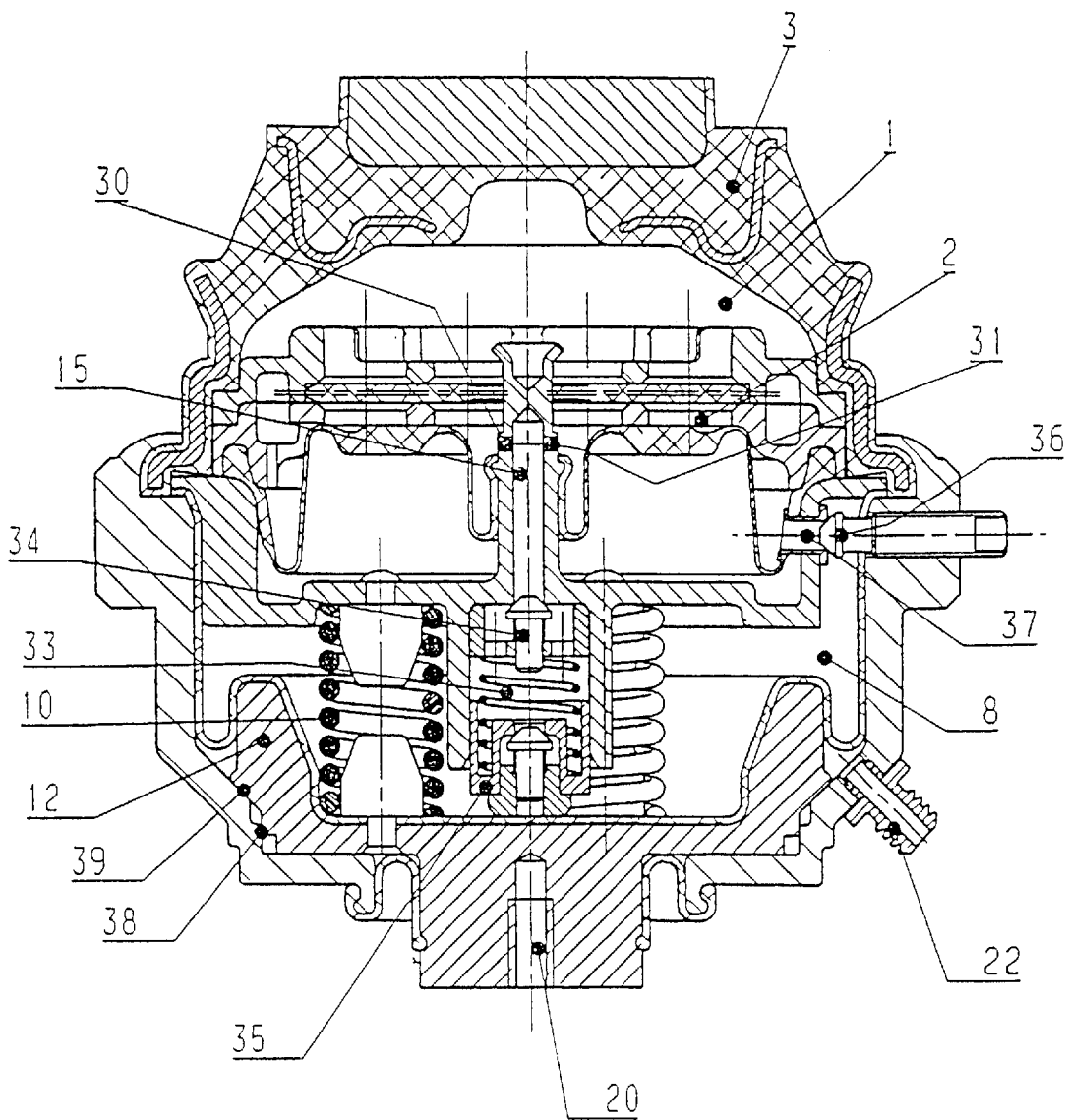
FIG. 4 is a two-chamber step bearing from FIG. 3 in the switching position with hard damping characteristic.

Another solution variant for the object according to the present invention is embodied in FIGS. 3 and 4 by the two-chamber step bearing shown there. Just as the step bearing according to the solution variant already described in detail above, this two-chamber step bearing also has a working chamber 1, which is limited by a rubber wall 3 on its upper side facing the engine to be mounted. The lower limitation of the working chamber 1 is formed by an intermediate plate 4, in the middle area of which an uncoupling membrane 5 made of an elastic material is recessed. A compensating chamber 2 is located under the uncoupling membrane 5 and the intermediate plate 4, and a fixed partition 6 is located on the underside of the compensating chamber 2. The compensating chamber 2 is sealed against the fixed partition 6 with a membrane 7 made of an elastic material.

On the side of the partition 6 facing away from the compensating chamber 2, a pretensioning chamber 8 is arranged, whose side walls are formed by a pot-shaped housing 9 and inside which three coil springs 10 located on a circle concentric to the central longitudinal axis are arranged. These coil springs 10 together form an additional spring element, which is connected in series with the first hydraulic rubber spring damping element formed by the working chamber 1, the compensating chamber 2, the rubber membrane 3, the membrane 4 and the overflow channel 11. The coil springs 10 are supported on their top side at the fixed partition 6, and the opposite end of the coil springs 10 is in contact with a bottom plate 12 of the two-chamber step bearing, which is arranged in the axial direction of the principal longitudinal axis of the two-chamber step bearing against the housing 9, displaceably in the said housing, and forms the bottom of the pretensioning chamber 8. The pretensioning chamber is sealed against the walls of the housing 9 as well as the bottom plate 12 by another membrane 19 made of an elastic material. On its underside facing away from the pretensioning chamber 8, the bottom plate 12 likewise has a threaded hole 20 for fixing the two-chamber step bearing to the body.

FIG. 3 shows that analogously to the exemplary embodiment shown in FIGS. 1 and 2, a gap 21 of about 3–5 mm is located between the bottom plate 12 and the lower, body-side area of the housing 9. Based on the fact that the rubber wall 3 fixed to the engine and the bottom plate 12 fixed to the body have fixed positions, the introduction of vibrations into the two-chamber step bearing leads to a movement of the partition 6 between the first rubber spring element, which is hydraulically damped by the hydraulic fluid present in the working chamber 1, the compensating chamber 2 and the overflow channel 1, and the second spring element formed by the coil springs 10 made of steel. The interaction of the two spring elements guarantees an effective damping of low-frequency vibrations of high amplitude due to the overall soft spring stiffness characteristic of the two-chamber step bearing in this mode of operation.

Compared with the first variant, the exemplary embodiment according to FIGS. 3 and 4 is characterized in that the partition 6 has in its middle a tubular partial area 15, which is connected in its upper end facing away from the partition 6 to the intermediate plate 4. As can be determined from FIGS. 3 and 4, the tubular partial area 15 has two connection holes 30 and 31 to the compensating chamber 2. A hollow cylindrical projection 32 is arranged on the underside of the partition 6. A first switching device 33, which comprises a nonreturn valve 34 and a plunger cylinder located thereunder, is located within the projection 32. The plunger cylinder 35 forms a pumping device, by means of which hydraulic fluid can be pumped from the compensating chamber into the pretensioning chamber 8 via the connection holes 30 and 31, the tubular partial area 15 and the nonreturn valve 34. Next to the switching device 33, the two-chamber step bearing according to the present invention shown in FIGS. 3 and 4 has a second switching device 36, which comprises an electromagnetic on-off valve and is suitable for closing a connection hole 37 between the pretensioning chamber 8 and the compensating chamber 2.

In the operating state of the two-chamber step bearing shown in FIG. 3, both the spring elements 10 and the upper hydraulic rubber spring damping element are active. The hydraulic fluid being transported by means of the plunger cylinder 35 from the compensating chamber into the pretensioning chamber can again move back into the compensating chamber 2 without problems because the on-off valve 36 is opened and the hydraulic fluid can flow through the connection hole 37.

If stiffening of the damping characteristic of the two-chamber step bearing is desired due to the operating state of the connected engine, the on-off valve 36 is actuated and it closes the connection hole 37. The flowing back of hydraulic fluid into the compensating chamber 2 is thus ruled out. The hydraulic fluid being transported by the plunger cylinder 35 from the compensating chamber 2 into the pretensioning chamber 8 is now used to build up a pressure cushion within the pretensioning chamber 8, which causes, analogously to the above-described mode of operation of the first solution variant, the bottom plate 12 to come into contact with the housing 9. The contact is via a cylindrical stop face 38 as well as a conical stop face 39. This double interlocking between the bottom plate 12 and the housing 9 guarantees that tilting of the two-chamber step bearing is prevented even at very strong radial forces because lateral forces occurring are reliably transmitted by the stop faces.

If the two-chamber step bearing is to be returned from the operating state with the hard damping characteristic, as is shown in FIG. 4, into the operating state with soft damping characteristic, it is necessary to eliminate the pressure cushion present in the pretensioning chamber 8, which makes the damping possibility of the coil springs 10 ineffective. The pressure cushion within the pretensioning chamber 8 is eliminated by opening the electromagnetic on-off valve 36, so that hydraulic fluid can flow back into the compensating chamber 2 due to the reopening of the connection hole 37.

The mode of operation of the plunger cylinder 35 provided as a pumping device will be explained in greater detail below on the basis of FIGS. 5a–d. FIGS. 5a–5d show an enlarged sectional view of the nonreturn valve 34 as well as of the plunger cylinder 35 which is likewise present in the projection 32.

The pumping effect of the plunger cylinder 35 is based on the movements of the partition 6 in the "soft" state of the hydraulic bearing, i.e., in the cases in which vibration can be introduced into the two-chamber step bearing. Based on the fact that the rubber wall 3 fixed to the engine and the bottom plate 12 fixed to the body assume fixed positions, the introduction of vibrations into the two-chamber step bearing leads to an up-and-down movement of the partition 6 corresponding to arrow B in FIG. 5a. A pumping cycle of the plunger cylinder 35 is brought about by an upward and downward movement corresponding to a vibration of the partition 6. FIGS. 5a–5d show different stages of the pumping cycle.

Figure 5A:
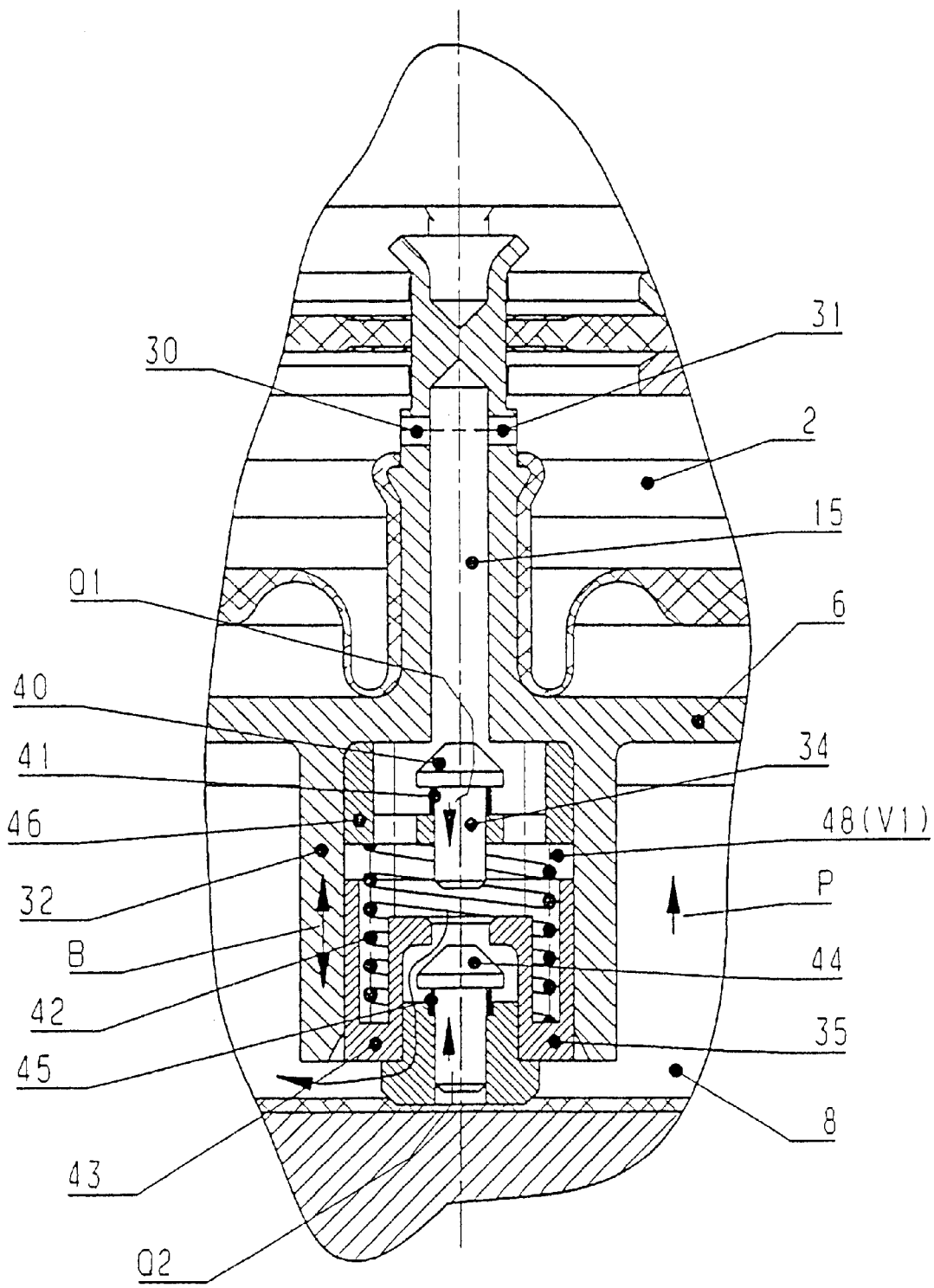
FIG. 5a is an enlarged view of the pumping device of the two-chamber step bearing according to FIG. 3 in a pumping position.

The plunger cylinder 35 comprises essentially a piston 43, which is displaceable axially in the direction of the principal axis of the two-chamber step bearing within the cylindrical projection 32 of the partition 6, a spacing spring 42, which is arranged in the intermediate chamber 48 with a variable volume $V_1$ between the top side of the piston 43 and the underside of the nonreturn valve housing 46, as well as a nonreturn valve, which is arranged centrally inside and comprises the valve seat 44 and the pressure spring 45. FIG. 5a shows the position of the two-chamber step bearing in which both the hydraulic rubber spring damping element and the coil spring element are active. This means that no pressure cushion is built up in the pretensioning chamber. The view in FIG. 5a shows that the piston 35 of the plunger cylinder has moved into the cylindrical projection 32 of the partition 6, both the nonreturn valve 34 and the nonreturn valve 47 located in the piston 43 are opened. The chamber volume $V_1$ between the nonreturn valve and the piston 43 has a low value.

If the partition 6 is moved upward in the direction of the compensating chamber corresponding to arrow P in FIG. 5a, the volume $V_1$ of the intermediate chamber 48 increases. Thus, a vacuum is generated in the chamber 48, which causes the valve seat 44 of the nonreturn valve 47 to be moved upward corresponding to arrow $Q_2$ under the effect of the vacuum and the spring forces of the pressure spring 45, which means that the nonreturn valve 47 closes. At the same time, hydraulic fluid is drawn by the overpressure in the chamber 48 into the intermediate chamber 48 through the opened nonreturn valve 34 from the compensating chamber 2 via the connection holes 30 and 31 as well as the tubular partial area 15 due to the overpressure in the chamber 48.

Figure 5B:
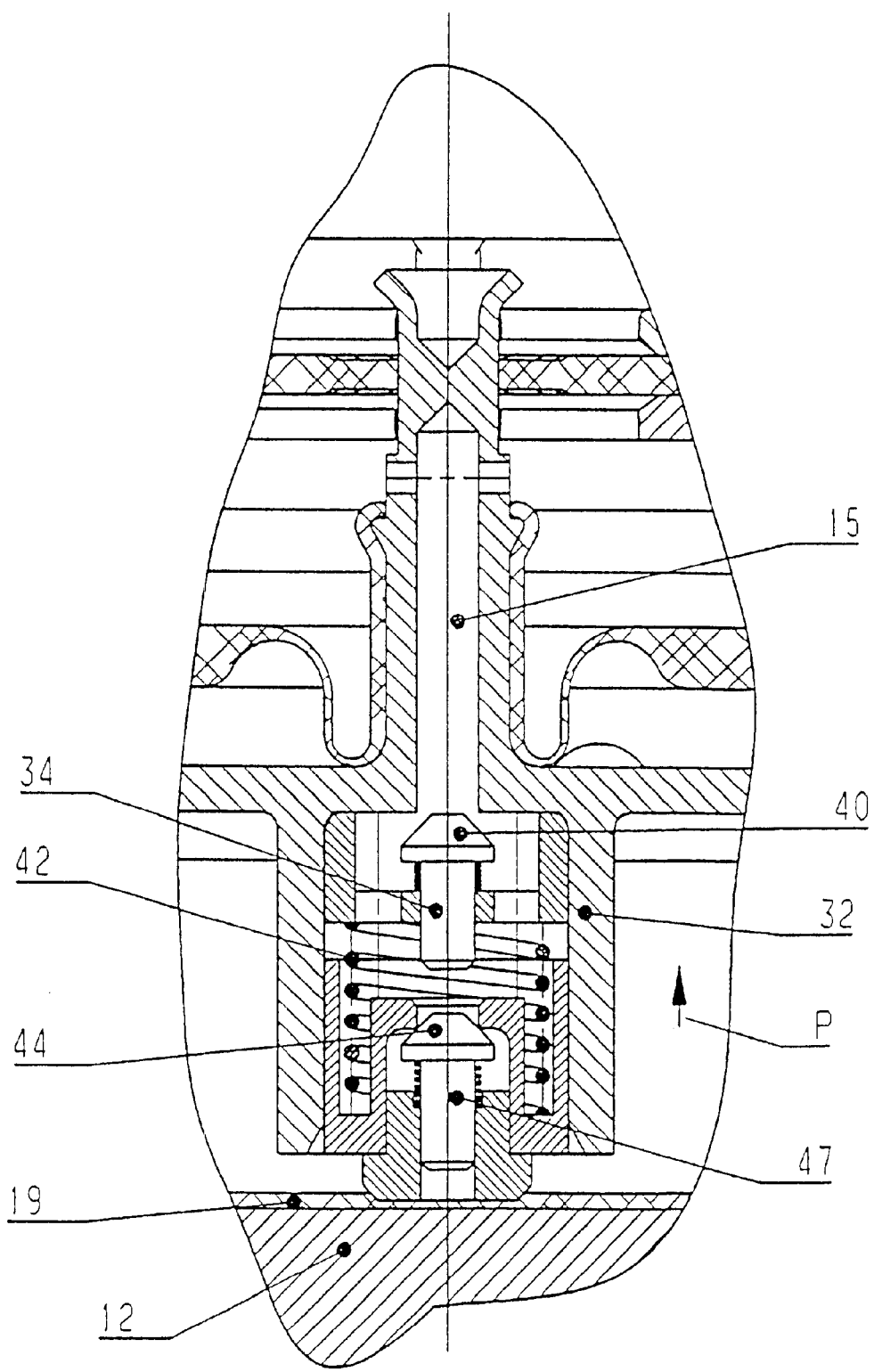
FIG. 5b is an enlarged view of the pumping device of the two-chamber step bearing according to FIG. 3 in another pumping position.

FIG. 5b shows the intermediate stage of the upward movement of the partition 6 at which the nonreturn valve 34 is opened and the nonreturn valve 47 is closed.

Figure 5C:
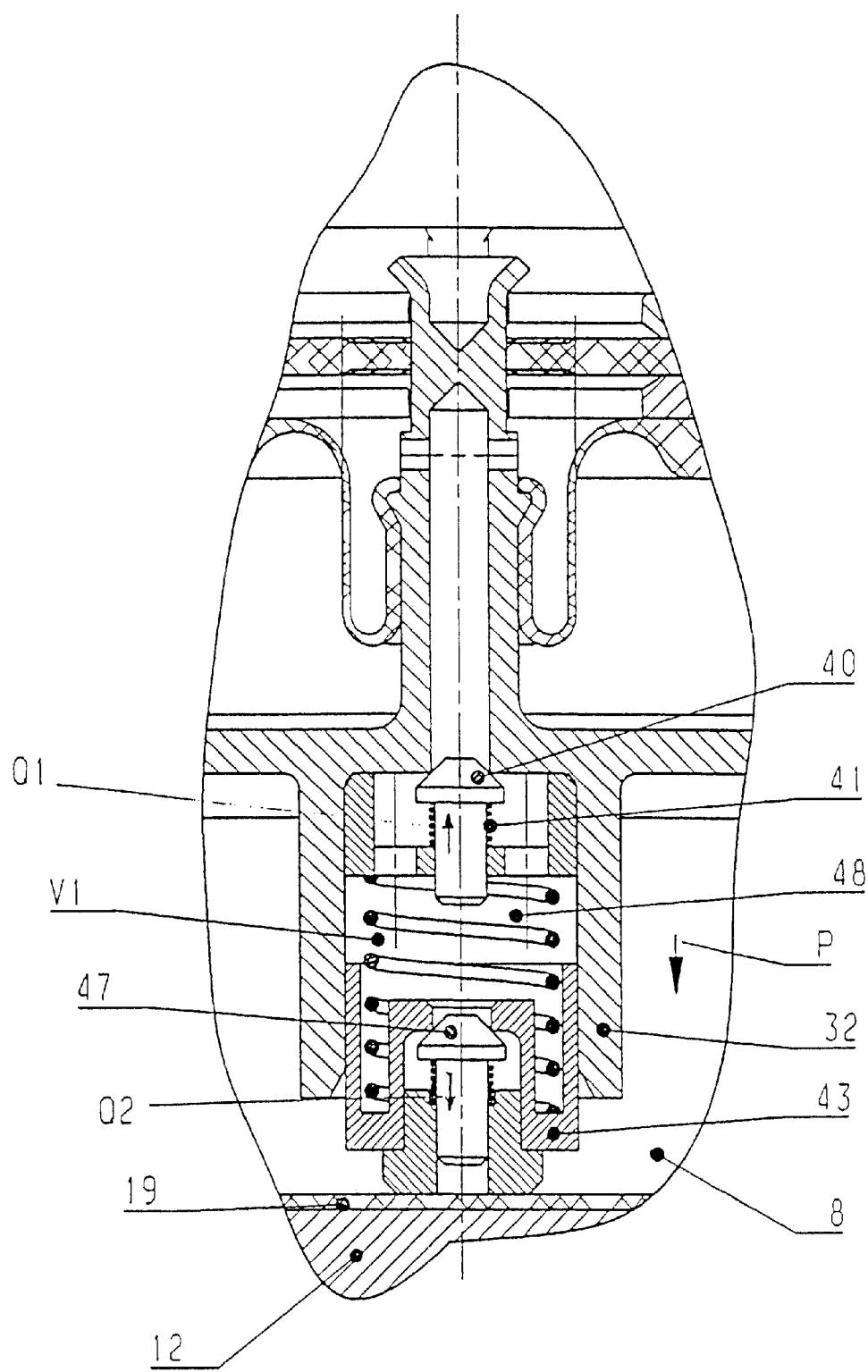
FIG. 5c is an enlarged view of the pumping device of the two-chamber step bearing according to FIG. 3 in another pumping position.

Due to the vibrating movement of the partition 6, the latter will subsequently perform a downward movement from the upward movement shown in FIGS. 5a and 5b corresponding to arrow P shown in FIG. 5c, as a result of which the largest possible volume $V_1$ of the intermediate chamber will again decrease at the moment of the reversal of the movement. The reduction in the volume leads to an increase in the pressure within the intermediate chamber 48, as a result of which the valve seat 40 of the nonreturn valve will move upward corresponding to arrow $Q_1$ because of the increasing pressure and the force of the pressure spring 41 and the nonreturn valve 34 will close as a consequence of this. The further movement of the partition 6 in the direction of arrow P leads to a further increase in the pressure within the intermediate chamber 48, as a result of which the nonreturn valve 47 arranged within the piston 43 will open. The hydraulic fluid present in the intermediate chamber 48 is pressed into the pretensioning chamber 8 through the opened nonreturn valve 47 as a consequence of the further downward movement of the partition 6.

Figure 5D:
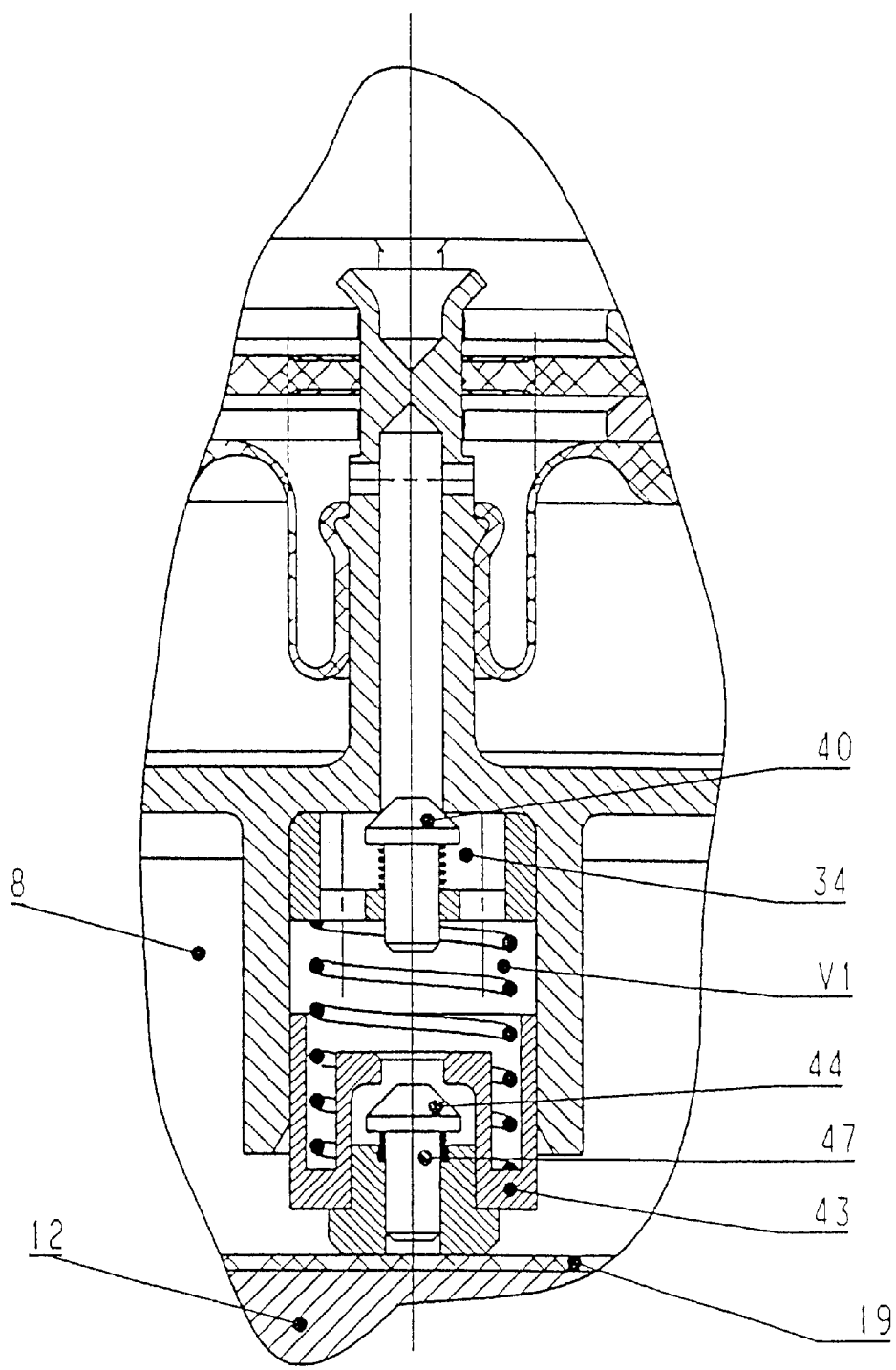
FIG. 5d is an enlarged view of the pumping device of the two-chamber step bearing according to FIG. 3 in still another pumping position.

FIG. 5d shows an intermediate stage during the downward movement of the partition 6, at which the nonreturn valve 34 is closed and the nonreturn valve 47 is opened, so that the hydraulic fluid present within the intermediate chamber 48 can escape downward into the pretensioning chamber 8.

If the partition 6 has passed through the bottom dead center of its movement within the framework of its vibration amplitude, at which the intermediate chamber 48 has assumed its smallest volume $V_1$, a new vibration cycle begins due to the repeated upward movement of the partition 6 corresponding to arrow P in FIG. 5a. The repeated upward movement of the partition 6 leads to a vacuum within the intermediate chamber 48, so that the nonreturn valve 47 closes, as it already happened in the explanation of FIG. 5a, while the nonreturn valve 34 opens, so that hydraulic fluid can again escape from the compensating chamber 2 into the intermediate chamber.

Thus, hydraulic fluid is pressed into the pretensioning chamber during each vibration cycle of the partition 6 located within the two-chamber step bearing, which leads to the build-up of the pressure cushion as long as the on-off valve 36 closes the connection hole 37 and no hydraulic fluid can thus escape from the pretensioning chamber.

Another advantage of this arrangement according to the present invention is that the piston 43 is also pretensioned by the gradual build-up of the pressure cushion within the pretensioning chamber 8, so that the vibrations fade out slowly and the plunger cylinder is no longer actuated. The bottom plate 12 is in contact with the housing 9 in this state corresponding to FIG. 4, so that the coil springs arranged between the bottom plate 12 and the partition 6 are ineffective.

A return into the state of the two-chamber step bearing in which the coil springs 10 are again active is brought about by the connection opening 37 being opened by the on-off valve 36. The overpressure in the pretensioning chamber 8 can be eliminated by the opening, so that the interlocking between the bottom plate 12 and the housing 9 is eliminated.

Corresponding to a special embodiment, the build-up of the pressure cushion or the interlocking between the bottom plate 12 and the housing 9 can be supported by a vacuum tube, which additionally supports the locking movement between the bottom plate 12 and the housing 9, being connected to a connecting fitting 22 introduced into the housing wall.

It appears clearly from the explanations given above that a two-chamber step bearing with hydraulic damping and two greatly different damping spring rates is created, in which the transition from a soft damping behavior to a hard damping behavior can be brought about only by the vibrations introduced into the two-chamber step bearing. An external drive is thus unnecessary for building up a corresponding pressure cushion, so that a very compact and inexpensive solution is possible. Since the fluid for building up a corresponding pressure cushion is incompressible, the entire system can absorb very strong axial forces. In addition, the solution variants described have the advantage that no loose components are present within the two-chamber step bearing and the bearing forms, moreover, a hermetically, tightly sealed system.

While specific embodiments of the invention have been shown and described in detail to illustrate the application of the principles of the invention, it will be understood that the invention may be embodied otherwise without departing from such principles.

What is claimed is:

1. A two-chamber step bearing with hydraulic damping, the bearing comprising:
   a first hydraulic damping spring element;
   a spring element;
   a fluid-filled working chamber;
   a compensating chamber connected to said working chamber through an overflow channel;
   a separate pretensioning chamber;
   an additional blockable spring element arranged in said separate pretensioning chamber and arranged in series after the damping spring element;
   at least two switching element said pretensioning chamber being connected to said working chamber and to said compensating chamber via said at least two switching elements with switching controlled independently from one another, wherein said pretensioning chamber can be filled with hydraulic fluid for blocking the said additional spring element by the vibrations introduced into the two-chamber step bearing from the engine.

2. A two-chamber step bearing in accordance with claim 1, one of said switching elements is a nonreturn valve arranged between said working chamber and said pretensioning chamber.

3. A two-chamber step bearing in accordance with claim 1, one of said switching elements is an electromagnetic on-off valve arranged between said compensating chamber and said pretensioning chamber.

4. A two-chamber step bearing in accordance with claims 1, wherein said blockable spring element is arranged between a partition, which forms a wall of the compensating chamber, and a movable bottom plate, which forms a wall of the pretensioning chamber.

5. A two-chamber step bearing in accordance with claim 1, wherein said blockable spring element comprises at least two coil springs arranged concentrically to the central longitudinal axis of the two-chamber step bearing.

6. A two-chamber step bearing in accordance with claim 5, wherein said movable bottom plate is held at an outer housing wall enclosing the two-chamber step bearing by a cylindrical centering surface and a conical centering surface in the blocking position of the spring element.

7. A two-chamber step bearing, comprising:
   a first hydraulic damping spring element;
   a spring element;
   a fluid-filled working chamber;
   a compensating chamber connected to said working chamber through an overflow channel;
   a separate pretensioning chamber;
   an additional blockable spring element arranged in said separate pretensioning chamber and arranged in series after the damping spring element;
   a first line connecting said pretensioning chamber to said compensating chamber with a pumping device, which is driven by the vibrations introduced into the two-chamber step bearing and is provided for filling up said pretensioning chamber with hydraulic fluid, is arranged; and
   a second line with an electromagnetic on-off valve inserted into it.

8. A two-chamber step bearing in accordance with claim 7, wherein the pumping device has a plunger piston and a nonreturn valve, wherein said nonreturn valve is arranged between said plunger piston and said compensating chamber and provides a possibility of flow from said compensating chamber to said pretensioning chamber.

9. A two-chamber step bearing in accordance with claims 7, wherein said blockable spring element is arranged between a partition, which forms a wall of the compensating chamber, and a movable bottom plate, which forms a wall of the pretensioning chamber.

10. A two-chamber step bearing in accordance with claim 7, wherein said blockable spring element comprises at least two coil springs arranged concentrically to the central longitudinal axis of the two-chamber step bearing.

11. A two-chamber step bearing in accordance with claim 10, wherein said movable bottom plate is held at an outer housing wall enclosing the two-chamber step bearing by a cylindrical centering surface and a conical centering surface in the blocking position of the spring element.

12. A motor vehicle engine mounting two-chamber step bearing with hydraulic damping, the bearing comprising:

a first hydraulic damping spring element;

a spring element;

a fluid-filled working chamber;

a compensating chamber connected to said working chamber through an overflow channel;

a separate pretensioning chamber;

an additional blockable spring element arranged in said separate pretensioning chamber and arranged in series after the damping spring element; and one of
- at least two switching elements, said pretensioning chamber being connected to said working chamber and to said compensating chamber via said at least two switching elements with switching controlled independently from one another, wherein said pretensioning chamber can be filled with hydraulic fluid for blocking the said additional spring element by the vibrations introduced into the two-chamber step bearing from the engine and
- a first line connecting said pretensioning chamber to said compensating chamber with a pumping device, which is driven by the vibrations introduced into the two-chamber step bearing and is provided for filling up said pretensioning chamber with hydraulic fluid, is arranged and a second line with an electromagnetic on-off valve inserted into it.

* * * * *